(12) United States Patent  
Kuromizu

(10) Patent No.: US 8,944,668 B2  
(45) Date of Patent: Feb. 3, 2015

(54) ILLUMINATING DEVICE, DISPLAY DEVICE, AND TELEVISION RECEIVING DEVICE

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 185 days.

(21) Appl. No.: 13/814,944

(22) PCT Filed: May 19, 2011

(86) PCT No.: PCT/JP2011/061572  
§ 371 (c)(1),  
(2), (4) Date: Feb. 8, 2013

(87) PCT Pub. No.: WO2012/023322  
PCT Pub. Date: Feb. 23, 2012

(65) Prior Publication Data  
US 2013/0141651 A1  Jun. 6, 2013

(30) Foreign Application Priority Data  
Aug. 17, 2010  (JP) .................................. 2010-182003

(51) Int. Cl.  
*F21V 7/04* (2006.01)  
*F21V 8/00* (2006.01)  
*G02F 1/1333* (2006.01)

(52) U.S. Cl.  
CPC ........ *G02F 1/033615* (2013.01); *G02B 6/0088* (2013.01); *G02B 6/0011* (2013.01); *G02B 1/133308* (2013.01); *G02B 6/0091* (2013.01); *G02F 2001/133314* (2013.01)  
USPC ........................................... 362/634; 349/58

(58) Field of Classification Search  
CPC .................... G02F 1/133308; G02F 1/133615; G02B 6/0011; G02B 6/0088; G02B 6/009; G02B 6/0091  
USPC ....................... 362/612, 632–634; 349/58–60  
See application file for complete search history.

(56) References Cited

U.S. PATENT DOCUMENTS  
2008/0030645 A1  2/2008  Nam et al.

FOREIGN PATENT DOCUMENTS  
JP  2005-038768 A  2/2005  
JP  2006-087173 A  3/2006  
JP  2008-041641 A  2/2008

OTHER PUBLICATIONS

Official Communication issued in International Patent Application No. PCT/JP2011/061572, mailed on Aug. 30, 2011.

*Primary Examiner* — Jason Moon Han  
(74) *Attorney, Agent, or Firm* — Keating & Bennett, LLP

(57) ABSTRACT

Provided is an illuminating device capable of preventing a light guide plate from being shaved because of contact with a fixation member on a back face side of an end portion of the plate. The illuminating device includes a light guide plate (11), a chassis (14) housing the plate and including a bottom plate (14a), and a light source holding member (15) fixed to the bottom plate by a fixation screw (16) and holding a light source (21) close to a light entrance face (11a) of the light guide plate, and further includes a concave portion 12 preventing contact between a screw head (16a) of the screw and the light guide plate and disposed on a back face of an end portion (11d) of the light guide plate at a position where the head is to be disposed if the screw is disposed on a side of the back face.

19 Claims, 18 Drawing Sheets

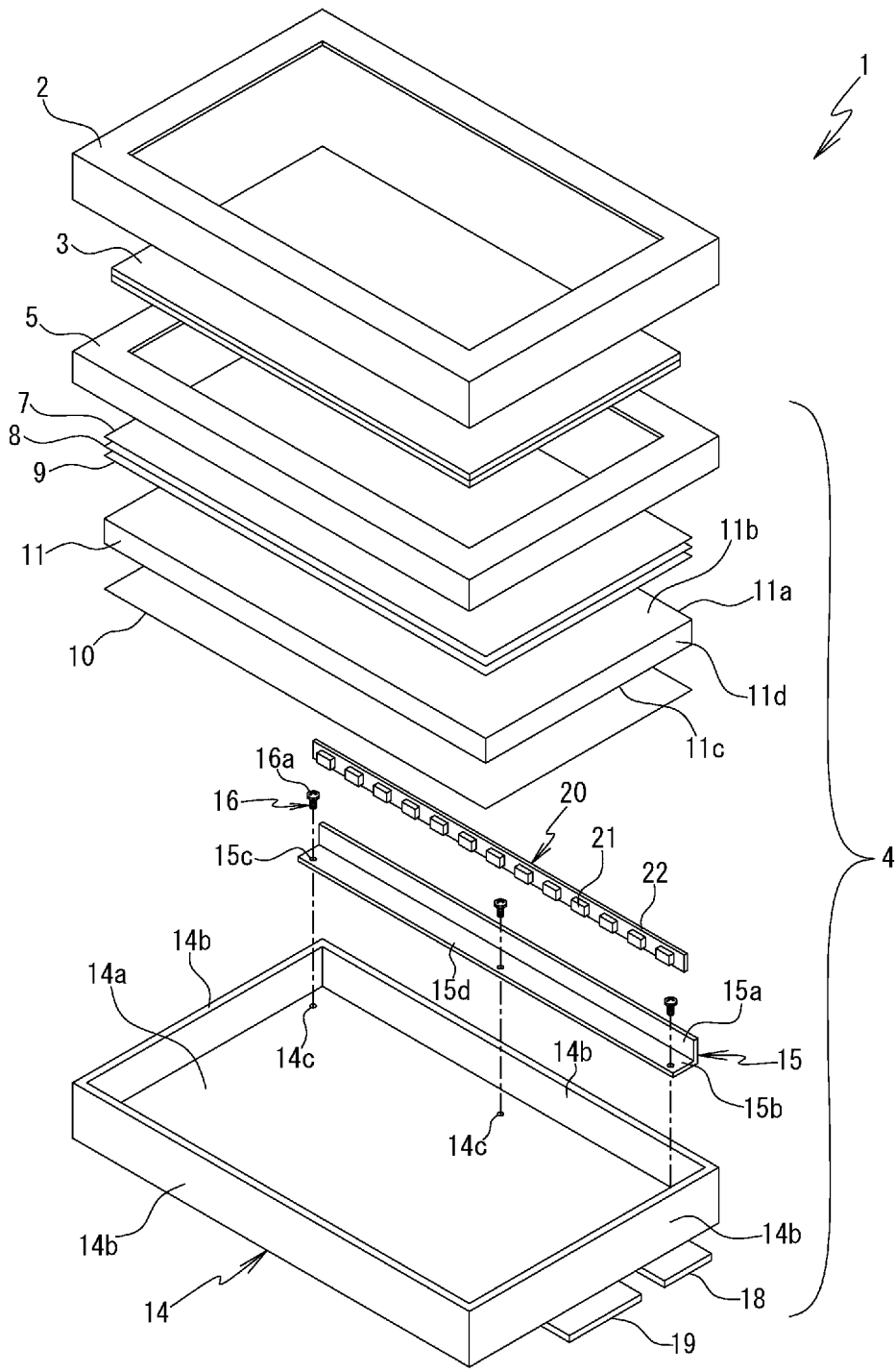
F I G. 2

ILLUMINATING DEVICE, DISPLAY DEVICE, AND TELEVISION RECEIVING DEVICE

TECHNICAL FIELD

The present invention relates to an illuminating device, and a display device, and a television receiving device.

BACKGROUND ART

A liquid crystal display panel with a transmissive liquid crystal display device includes the liquid crystal display device, and an illuminating device that is disposed behind the liquid crystal display panel so as to project light thereonto. A side (edge) light type illuminating device is known as this type of illuminating device, which includes a light guide plate that defines a clear plate made from an acrylate resin, and a light source that is disposed along one side or a plurality of sides of the light guide plate. The side light type illuminating device having this configuration has the advantage of being easily reduced in thickness compared with a direct illuminating device having a configuration that a light source is disposed behind a liquid crystal display panel.

Especially when the side light type illuminating device includes an LED (Light-Emitting Diode) as the light source, the light source has the advantages of a long life and a high luminous efficiency, which has been receiving widespread attention. FIGS. 16 and 17 are an exploded perspective view and a cross-sectional view of relevant components, respectively, which show a schematic configuration of a liquid crystal display device including a side light type illuminating device that includes LEDs as described above.

As shown in FIGS. 16 and 17, a liquid crystal display device 100 includes a liquid crystal display panel 103, an illuminating device (backlight device) 104, and other components.

A bezel 102 has a frame shape so as to cover a peripheral portion of the liquid crystal display panel 103. The bezel 102 is, together with a chassis 114, arranged to ensure strength of the entire liquid crystal display device 100. The liquid crystal display panel 103 consists of two glass substrates that are bonded together while sandwiching liquid crystals therebetween. The liquid crystal display panel 103 is arranged to display an image on its front face by using light emitted from the illuminating device 104.

The illuminating device 104 includes the chassis 114 having the shape of a box of low height. Optical sheets 107 to 109, a light guide plate 111, a reflection sheet 110, and an LED board 120 are housed inside of the illuminating device 104.

The light guide plate 111 includes a light entrance face 111a from which light emitted from LEDs 121 mounted on the LED board 120 enters, and a light exit face 111b from which the light that has entered from the light entrance face 111a is emitted upward (in a direction of light projection) as shown in FIG. 17. The light entrance face 111a defines a lateral end face of an end portion 111d of the light guide plate 111. The light exit face 111b defines a front face of the light guide plate 111.

The reflection sheet 110 is disposed so as to cover a back face 111c of the light guide plate 111, which is an opposite face to the light exit face 111b of the light guide plate 111. The optical sheets 107 to 109 include a diffusion sheet and a lens sheet, and are disposed so as to cover the light exit face 111b of the light guide plate 111.

A stack of the optical sheets 107 to 109, the light guide plate 111, and the reflection sheet 110 is disposed on a bottom plate 114a of the chassis 114 while fixed thereon by a frame 105 having a frame shape.

The plurality of LEDs 121 mounted on the LED board 120 are disposed close to the light entrance face 111a of the light guide plate 111. The plurality of LEDs 121 are spaced apart from each other at specified intervals along the light entrance face 111a such that light emitting surfaces 121a of the LEDs 121 oppose the light entrance face 111a of the light guide plate 111. In this case, the LED board 120 is attached to a light source holding member 115 disposed on the bottom plate 114a close to a side plate 114b of the chassis 114.

The light source holding member 115 has the shape of a so-called bracket (L-shaped mounting hardware), and is made by cutting aluminum. In this case, the light source holding member 115 consists of a long plate 115a to which the LED board 120 is attached, and a long plate 115b arranged to be fixed to the bottom plate 114a of the chassis 114 by fixation screws 116 that define fixation members such as flat head screws and hexagonal screws, the plate 115a and the plate 115b being disposed so as to have an L-shape. The following literature is cited as a prior art literature relating to the present invention.

CITATION LIST

Patent Literature

PTL 1: JP 2008-41641

SUMMARY OF INVENTION

Technical Problem

In recent years, a frame region of the liquid crystal display device 100 having the configuration described above has been desired to be made narrow. Making the frame region narrow defines reducing the area of a frame region A that surrounds a display portion of the liquid crystal display panel 103 as shown in FIG. 17.

As shown in FIG. 18A, the area of the frame region A can be reduced by disposing the plate 115b of the light source holding member 115 on the side of the light guide plate 111, not on the side of the side plate 114b of the chassis 114, to decrease the distance between the plate 115a of the light source holding member 115 and the side plate 114b of the chassis 114 compared with the configuration shown in FIG. 17.

However, a problem arises that if screw heads 116a of the fixation screws 116 that jut upward out of a front face of an end portion of the plate 115b are disposed on a back face side of the end portion 111d of the light guide plate 111 in the configuration that the plate 115b of the light source holding member 115 is disposed on the side of the light guide plate 111 as shown in FIG. 18A, some portions of the light guide plate 111, which make contact with the screw heads 116a when the light guide plate 111 is shaken by vibrations made during transportation of the liquid crystal display device 100, are shaved to produce shavings 118.

The shavings 118 produced as described above adhere to the light emitting surfaces 121a of the LEDs 121, or enter into a front face side of the optical sheets 107 to 109, so that luminance unevenness could develop in images displayed on the liquid crystal display panel 103 to reduce the display quality.

An object of the present invention is to provide an illuminating device, a display device, and a television receiving device, which are capable of preventing contact between a jutting portion of a fixation member and a back face of an end portion of a light guide plate and thus preventing the light guide plate from being shaved when the illuminating device, the display device, and the television receiving device have a configuration that a light source holding member, which is arranged to hold a group of aligned light sources that are opposed to a lateral end face of the light guide plate disposed on an inner bottom face of a chassis from which light enters and arranged to project light onto a light entrance face of the light guide plate, is fixed to a bottom plate of the chassis by the fixation member.

Solution to Problem

To achieve the objects and in accordance with the purpose of the present invention, an illuminating device of the present invention includes a light guide plate including a light exit face having a planar shape, a light entrance face on an end portion of light exit face, from which light projected from a light source enters, and a back face opposite to the light exit face, a chassis arranged to house the light guide plate and including a bottom plate on which the light guide plate is disposed, and a light source holding member fixed to the bottom plate of the chassis by a fixation member and arranged to hold the light source so as to be disposed close to the light entrance face of the light guide plate housed in the chassis, and further includes a concave portion arranged to prevent contact between the fixation member and the light guide plate, the concave portion being provided on the back face of the end portion of the light guide plate at a position where the fixation member is to be disposed if the fixation member by which the light source holding member is fixed to the bottom plate of the chassis is disposed on a side of the back face of the end portion of the light guide plate.

This configuration of including the concave portion disposed on the back face of the end portion of the light guide plate can prevent contact between the light guide plate and the fixation member on the back face side of the light guide plate, which can accordingly prevent shavings from being produced from the light guide plate when the light guide plate is shaken. Thus, no shavings are produced to be adhered to the light source, which can prevent luminance unevenness resulting from such shavings.

In this case, it is preferable that the light source holding member further includes a plate to which the light source is attached and a plate arranged to be fixed to the bottom plate of the chassis by the fixation member, the plates being disposed having an L-shape, wherein an end portion of the plate arranged to be fixed to the bottom plate, the end portion being disposed on a side of the light guide plate, overlaps with the back face of the end portion of the light guide plate when seen in a plan view. In this configuration, because the plate arranged to be fixed to the bottom plate is disposed on the side of the light guide plate, which is opposite to the side of the side plate of the chassis, the distance between the plate to which the light source is attached and the side plate of the chassis can be decreased, which can make a frame region narrow. In addition, because the concave portion disposed on the back face of the end portion of the light guide plate can prevent contact between the fixation member, by which the plate arranged to be fixed to the bottom plate is fixed to the bottom plate of the chassis, and the back face of the end portion of the light guide plate, shavings are prevented from being produced from the light guide plate when the light guide plate is shaken. It is also preferable that light source holding member includes the plate to which the light source is attached, and the plate arranged to be fixed to the bottom plate, the plates being disposed having an inverted T-shape, a laterally laid U-shape, or an inverted Y-shape.

It is also preferable that the concave portion has a notch shape extending from the light entrance face of the light guide plate. This configuration allows the concave portion to be produced more easily by making cutting at a given portion in the back face of the end portion of the light guide plate. Thus, the cost of processing and production of the concave portion can be reduced.

It is also preferable that a plurality of fixation members are disposed in a longitudinal direction of the light entrance face of the light guide plate, and the concave portion has a strip shape when seen in a plan view to house the plurality of fixation members in a lump. This configuration allows the concave portion to be produced in order to prevent contact with the plurality of fixation members by making one-time cutting in the back face of the end portion of the light guide plate. Thus, the cost of processing and production of the concave portion can be reduced.

It is also preferable that the concave portion has a round shape, an oval shape, a triangular shape, a quadrangular shape, or a hexagonal shape. It is also preferable that the fixation member defines a flat head screw, a hexagonal screw, a rivet, or a clip arranged to sandwich the light source holding member and the bottom plate of the chassis, which are widely used fixing members.

In another aspect of the present invention, a display device of the present invention includes the illuminating device described above, and a display panel arranged to make a display by using the light emitted from the illuminating device. Including the illuminating device having the configuration that luminance unevenness does not easily result from shavings produced from the light guide plate, the display device of the present invention can achieve an image display where reduction in image quality is prevented.

The examples of the display panel include a liquid crystal display panel. The examples of the display device include a liquid crystal display device, and the liquid crystal display device can be applied to various uses, such as a display for a television receiving device and a display for a personal computer. In particular, the liquid crystal display device can be preferably applied to a large-screen display.

Advantageous Effects of Invention

According to the present invention, the configuration of including the concave portion disposed on the back face of the light guide plate can prevent contact between the light guide plate and the fixation member on the back face side of the light guide plate, which can accordingly pr event shavings from being produced from the light guide plate when the light guide plate is shaken. Thus, no shavings are produced to be adhered to the light source, which can prevent luminance unevenness resulting from such shavings.

BRIEF DESCRIPTION OF DRAWINGS

FIG. 2 is an exploded perspective view showing a schematic configuration of a liquid crystal display device included in the television receiving device shown in FIG. 1.

FIG. 6A is an external perspective view showing the concave portions of the light guide plate of modification 1. FIG. 6B is an external perspective view showing the concave portions of the light guide plate of modification 2.

FIG. 7A is an external perspective view showing the concave portions of the light guide plate of modification 3. FIG. 7B is an external perspective view showing the concave portions of the light guide plate of modification 4.

FIG. 11A is an external perspective view showing the concave portions of the light guide plate of modification 1. FIG. 11B is an external perspective view showing the concave portions of the light guide plate of modification 2.

FIG. 12A is an external perspective view showing the concave portions of the light guide plate of modification 3. FIG. 12B is an external perspective view showing the concave portions of the light guide plate of modification 4.

FIG. 13A is a cross-sectional view showing the light source holding member of modification 1. FIG. 13B is a cross-sectional view showing the light source holding member of modification 3.

FIG. 15A is a cross-sectional view showing the fixation member of modification 1. FIG. 15B is a cross-sectional view showing the fixation member of modification 2.

DESCRIPTION OF EMBODIMENTS

Detailed descriptions of preferred embodiments of an illuminating device, a display device, and a television receiving device of the present invention will now be provided with reference to the accompanying drawings.

Figure 1:
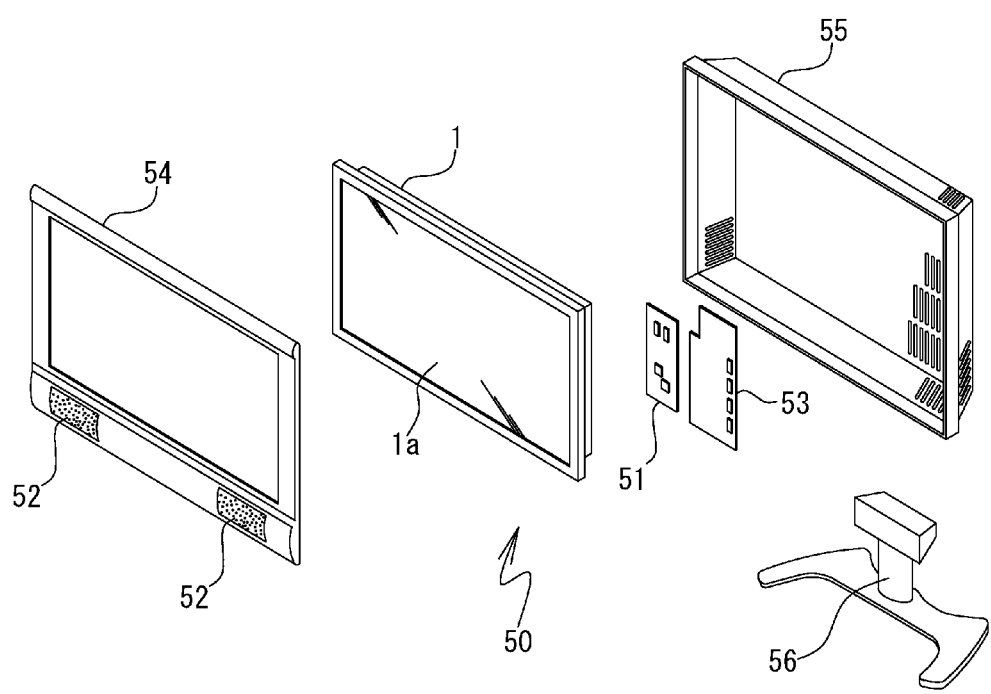
FIG. 1 is an exploded perspective view showing a schematic configuration of a television receiving device of a preferred embodiment of the present invention.

FIG. 1 is an exploded perspective view showing a schematic configuration of a television receiving device of the present embodiment. A television receiving device 50 includes a liquid crystal display device 1, a tuner 51, speakers 52, and an electric power supply 53 arranged to supply electric power to the liquid crystal display device 1, the tuner 51, and the speakers 52. The liquid crystal display device 1, the tuner 51, the speakers 52 and the electric power supply 53 are housed in a housing consisting of a front side cabinet 54 and a back side cabinet 55, and supported by a stand 56. The liquid crystal display device 1 is housed in an upright position such that a display surface 1a of the liquid crystal display device 1 is oriented vertically.

The liquid crystal display device 1 includes a liquid crystal display panel 3, and an illuminating device (backlight device) 4 arranged to project light thereonto, which are held together by a bezel 2 having a frame shape as shown in FIG. 2. The bezel 2 has a frame shape to cover a peripheral portion of the liquid crystal display panel 3. The bezel 2 is, together with a chassis 14 of the illuminating device 4, arranged to ensure strength of the entire liquid crystal display device 1.

The liquid crystal display panel 3 has a rectangular shape when seen in a plan view, and includes a pair of glass substrates consisting of a thin film transistor (TFT) array substrate and a color filter (CF) substrate, which are bonded together so as to be opposed parallel to each other having a given space therebetween, in which liquid crystals are filled.

A plurality of TFTs and pixel electrodes are arranged in a matrix on the TFT array substrate. A plurality of color patterns are arranged in a matrix on the CF substrate, and a common electrode is provided over the entire surface of the CF substrate. By varying a voltage applied to the pixel electrodes and the common electrode, alignment of the liquid crystals can be controlled, whereby an image can be displayed. The liquid crystal display panel 3 includes polarizing plates on a front and a back face.

The illuminating device 4 defines a so-called side (edge) light type illuminating device. The illuminating device 4 includes the box-shaped chassis 14 that has an opening that is open to the side of the liquid crystal display panel 3, and optical sheets 7 to 9 disposed covering the opening of the chassis 14 as shown in FIG. 2. In addition, the chassis 14 includes an LED board 20 on which a plurality of LEDs (Light Emitting Diodes) 21 are mounted, a light guide plate 11 arranged to guide light emitted from the LEDs 21 to the side of the liquid crystal display panel 3, and a reflection sheet 10 disposed behind the light guide plate 11, which are housed inside of the chassis 14.

The frame 5 is arranged to fix the optical sheets 7 to 9, the light guide plate 11 and the reflection sheet 10, which are stacked in this order from the top, to the chassis 14. In this case, the frame 5 has a frame shape lying on an outer peripheral portion of the light guide plate 11, and is capable of pressing the almost entire outer peripheral portions of the optical sheets 7 to 9 and the light guide plate 11 from the front side. The frame 5 is made preferably from a black synthetic resin, and has a light shielding effect. The frame 5 has a configuration of receiving the back face of the outer peripheral portion of the light guide plate 11 by its frame-shaped front face.

The chassis 14 has the shape of a box of low height and is prepared preferably by bending a metal plate made from aluminum. The chassis 14 is arranged to house the optical sheets 7 to 9, the light guide plate 11, the reflection sheet 10, a light source holding member 15, and the LED board 20. The chassis 14 includes a bottom plate 14a having a rectangular shape when seen in a plan view, and side plates 14b that erect from the four sides of the outer edge of the bottom plate 14a. The side plates 14b have a configuration that the frame 5 and the bezel 2 can be attached thereto by screws.

The three optical sheets 7 to 9 define thin resin sheets, which have a rectangular shape when seen in a plan view. The three optical sheets 7 to 9 are disposed on the front side of the light guide plate 11 (the side from which light is emitted) and lie between the liquid crystal display panel 3 and the light guide plate 11. The optical sheets 7 to 9 preferably define the polarization selective reflection sheet 7, the lens sheet 8 and the diffusion sheet 9, which have a thickness of about 0.1 to 0.5 mm, and are stacked in this order from the top.

In this embodiment, the diffusion sheet 9 is arranged to diffuse the light emitted from the light guide plate 11, allowing uniformalization of luminance distribution of the light. The lens sheet 8 is arranged to gather the light that is emitted from the diffusion sheet 9 to allow enhancement of the front luminance of the light. The polarization selective reflection sheet 7 is arranged to selectively reflect the light emitted from the lens sheet 8 so that the light is not absorbed by a polarizing plate (not illustrated) that is attached on the back side of the liquid crystal display panel 3.

The light guide plate 11 has a rectangular shape when seen in a plan view, and preferably defines a clear plate made from a resin and having a thickness of about 3 to 4 mm. The light guide plate 11 includes a light entrance face 11a from which light emitted from the LEDs 21 enters, and a light exit face lib from which the light that has entered from the light entrance face 11a is emitted upward (in a direction of light projection). The light entrance face 111a defines a lateral end face of a given end portion 11d of the light guide plate 11. The light exit face lib defines a front face of the light guide plate 11.

The light guide plate 11 is arranged to repeatedly reflect the light, which has entered from the light entrance face 11a, between the light exit face (front face) lib and a back face 11c, which is the opposite face to the light exit face lib, to planarly diffuse the light inside the light guide plate 11. The light guide plate 11 includes a plurality of scattering members (not illustrated) on the back face 11c, which are arranged to scatter the light, which has entered from the light entrance face 11a, and emit the light from light exit face 11b. The scattering members are preferably provided thereon by dotting paint containing a white pigment in a printing method on the back face 11c of the light guide plate 11.

The plurality of LEDs 21 mounted on the LED board 20 are disposed close to the light entrance face 11a of the light guide plate 11. The plurality of LEDs 11 are spaced apart from each other at specified intervals along the light entrance face 11a such that light emitting surfaces 21a of the LEDs 21 oppose the light entrance face 11a of the light guide plate 11. In this case, the LED board 20 is attached to the light source holding member 15 having an L-shape so as to stand thereon, while the light source holding member 15 is fixed to the bottom plate 14a close to the side plate 14b of the chassis 14.

The light source holding member 15 has the shape of a so-called bracket (L-shaped mounting hardware), and is made by cutting aluminum. In this case, the light source holding member 15 consists of a long plate 15a to which the LED board 20 is attached, and a long plate 15b arranged to be fixed to the bottom plate 114a of the chassis 114, the plate 115a and the plate 115b being disposed so as to have the L-shape.

The plate 15b of the light source holding member 15 includes holes 15c disposed at three positions of both the ends and the middle of the plate 15b, the holes 15c having a configuration that fixation screws 16 that define fixation members such as flat head screws and hexagonal screws pass through the holes 15c. In addition, the bottom plate 14a of the chassis 14 includes screw holes 14c disposed at positions corresponding to the three positions for the holes 15c, the screw holes 14c having a configuration that end portions of the fixation screws 16 are screwed into the screw holes 14c. Thus, the light source holding member 15 has the configuration that the fixation screws 16 are made to pass through the holes 15c of the plate 15b to be screwed into the screw holes 14c of the bottom plate 14a, whereby the light source holding member 15 can be fixed to a given position close to the side plate 14b of the chassis 14.

Figure 3:
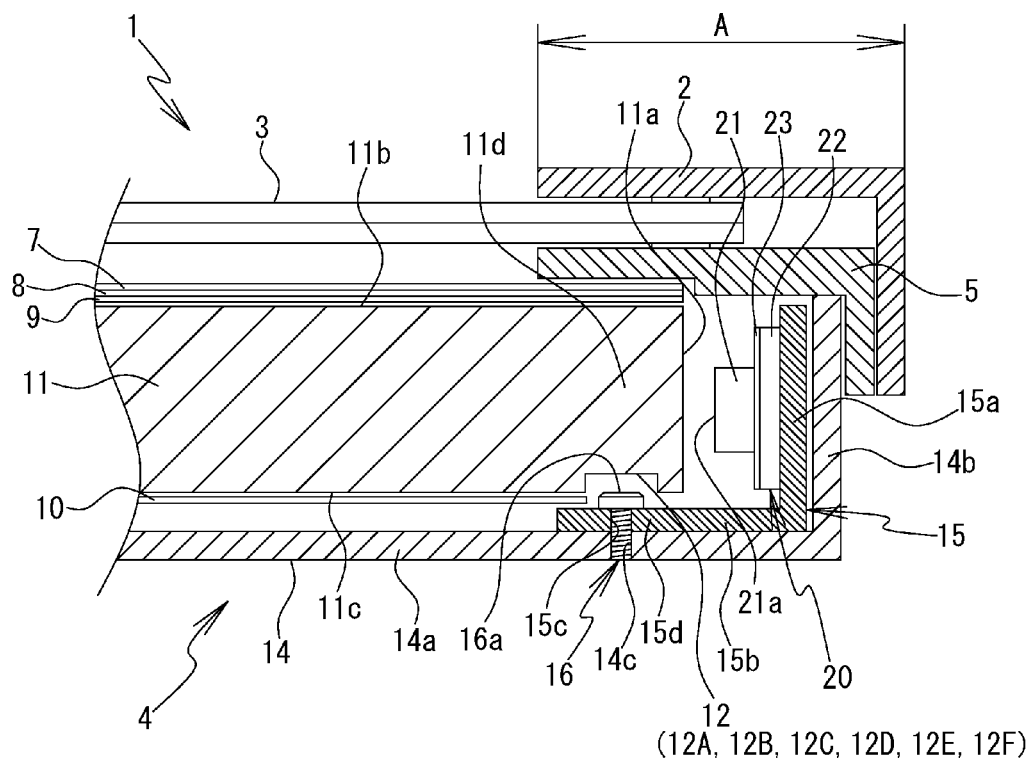
FIG. 3 is an enlarged cross-sectional view showing assembled relevant components of the liquid crystal display device shown in FIG. 2.

In the present embodiment, the area of a frame region A can be reduced by disposing the plate 15b of the light source holding member 15 on the side of the light guide plate 11, not on the side of the side plate 14b of the chassis 14, to decrease the distance between the plate 15a of the light source holding member 15 and the side plate 14b of the chassis 14 as shown in FIG. 3.

The reflection sheet 10 is disposed so as to cover the back face 11c of the light guide plate 11, which is an opposite face to the light exit face 11b of the light guide plate 11. In the present embodiment, the reflection sheet 10 is disposed on the bottom plate 14a of the chassis 14. The reflection sheet 10 is arranged to reflect the light toward the light guide plate 11, the light emitting toward the back side from the back face 11c of the light guide plate 11. For example, the reflection sheet 10 defines a resin sheet having a thickness of about 0.1 to 2 mm. In the present embodiment, the front face of the reflection sheet 10 is painted white so as to effectively reflect the light emitted from the back face 11c toward the side of the light guide plate 11, so that the use efficiency of the light can be improved to enhance the luminance of the light on the light exit face lib of the light guide plate 11.

Thus, including the optical sheets 7 to 9, the light guide plate 11 and the reflection sheet 10, the illuminating device 4 is capable of making the light emitted from the LEDs 21 into planar light to project the planar light onto the back face of the liquid crystal display panel 3. A power board 18 arranged to supply power to the LED board 20, and a control board 19 arranged to drive the liquid crystal display panel 3 are provided behind the chassis 4.

The LED board 20 includes a radiating plate 22 made from metal such as aluminum as shown in FIG. 3. The LED board 20 has a rectangular shape. The LED board 20 includes an insulating layer 23 disposed on the front face of the radiating plate 22. The LEDs 21 (thirteen pieces in the present embodiment) are aligned on the insulating layer 23 in a longitudinal direction of the LED board 20 (radiating plate 22). The LEDs 21 are connected in series to each other by wiring patterns provided on the insulating layer 12 (not illustrated).

In the present embodiment, the radiating plate 22 has the function of a base member, and is arranged to prevent a rise in temperature by heat generated from the LEDs 21. In the present embodiment, the radiating plate 22 is attached to be fixed to the plate 15a of the light source holding member 15 by a thermal conductive sheet that has adhesive faces on both sides (not illustrated). Thus, the heat generated from the LEDs 21 is conducted to the bottom plate 14a of the chassis 14 via the radiating plate 22, the thermal conductive sheet and the light source holding member 15, which can prevent an excessive rise in temperature of the LEDs 21.

Each of the LEDs 21 has a package structure such that an LED chip that emits blue light is encapsulated in a transparent resin into which a yellow fluorescent material is mixed, for example. Thus, the LEDs 21 are capable of emitting white light from the light emitting surfaces 21a.

The plate 15b of the light source holding member 15 is disposed such that an end portion 15d thereof is disposed so as to overlap with the back face of the end portion 11d of the light guide plate 11 when seen in a plan view as shown in FIG. 3. In this case, the fixation screws 16 are disposed at a portion between the end portion 15d of the plate 15b and the back face of the end portion 11d of the light guide plate 11 where the end portion 15d and the back face of the end portion 11d overlap each other. Thus, the fixation screws 16 are disposed such that screw heads 16a thereof jut toward the back face of the end portion 11d of the light guide plate 11.

In the present embodiment, the light guide plate 11 includes concave portions 12, which are dented to the front side of the light guide plate 11, on the back face of the end portion 11d of the light guide plate 11 at positions where the screw heads 16a of the fixation screws 16 are to be disposed. The concave portions 12 each have openings that are larger than the external diameter of the screw heads 16a of the fixation screws 16. The concave portions 12 have a depth larger than the height of the screw heads 16a of the fixation screws 16. Thus, getting into the concave portions 12, the screw heads 16a of the fixation screws 16 can be prevented from making contact (interference) with the inner surfaces of the concave potions 12.

Figure 18A:
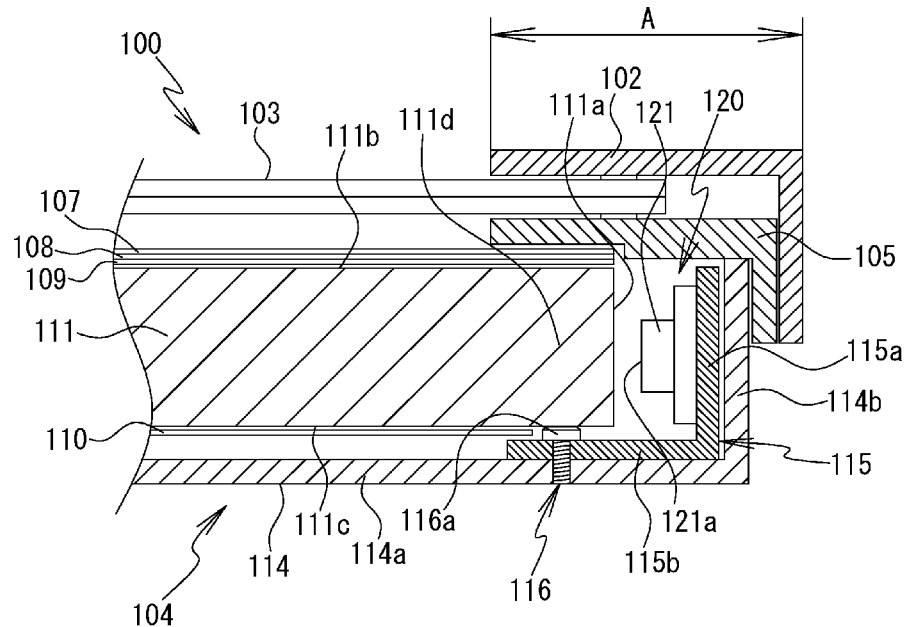
FIG. 18A is a cross-sectional view showing a liquid crystal display device including a light source holding member having a different configuration from the light source holding member shown in FIG. 16.
Figure 18B:
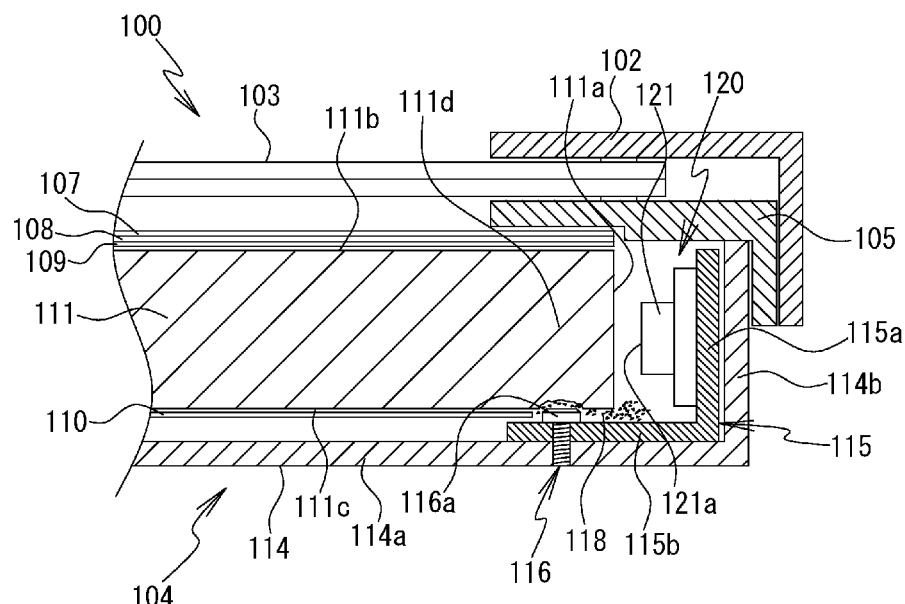
FIG. 18B is an explanatory view showing a problem in the liquid crystal display device shown in FIG. 18A.

As described above, the configuration of including the concave portions 12 disposed at the given positions on the back face of the end portion 11d of the light guide plate 11 can prevent contact (interference) between the light guide plate 11 and the screw heads 16a of the fixation screws 16 disposed on the back face side of the end portion 11d, which can accordingly prevent shavings 118 from being produced from the light guide plate 11 when the light guide plate 11 is shaken as shown in FIG. 18B.

Thus, because no shavings 118 are produced, the illuminating device 4 is free from a problem that shavings 118 adhere to the light emitting surfaces 21a of the LEDs 21 or enter into the front face side of the optical sheets 7 to 9 to make luminance unevenness develop in images displayed on the liquid crystal display device 1 to reduce the display quality.

Figure 4A:
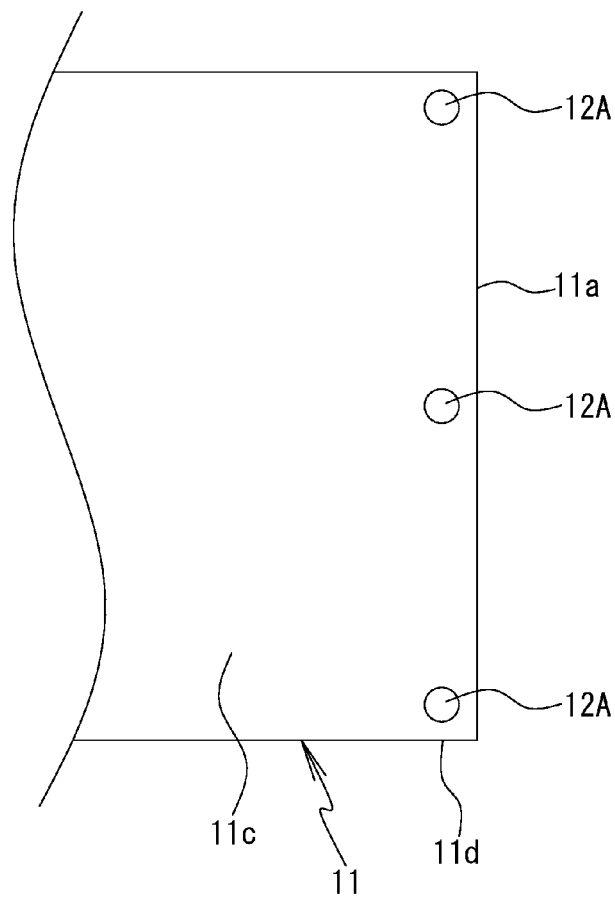
FIG. 4A is a plan view showing concave portions of the light guide plate of a first embodiment of the present invention, which are seen from behind.
Figure 4B:
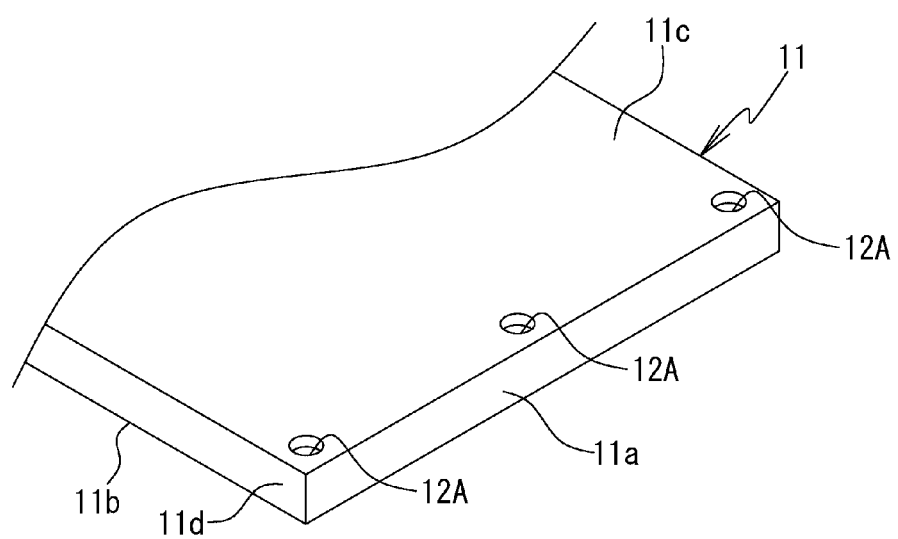
FIG. 4B is an external perspective view showing the same.
Figure 5A:
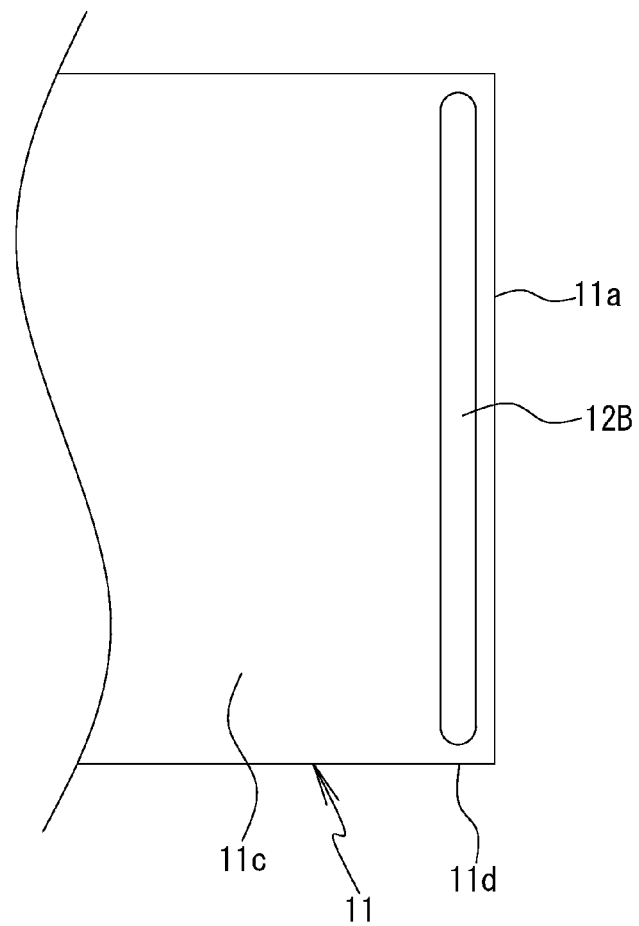
FIG. 5A is a plan view showing a concave portion of the light guide plate of a second embodiment of the present invention, which is seen from behind.
Figure 5B:
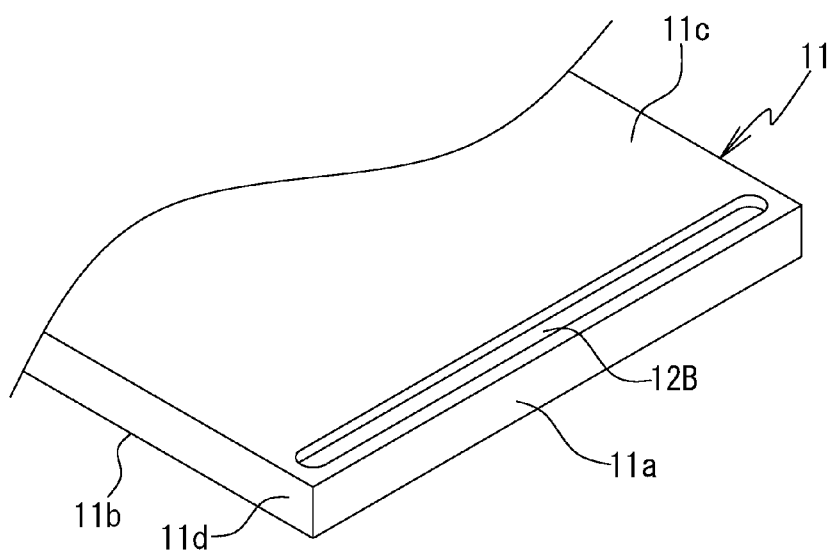
FIG. 5B is an external perspective view showing the same.

The concave portions 12 of a first embodiment define concave portions 12A having round openings as shown in FIGS. 4A and 4B, which are disposed at the given positions on the back face of the end portion 11d of the light guide plate 11. Alternatively, the concave portions 12 of a second embodiment define a concave portion 12B having a strip-shaped opening disposed in a longitudinal direction of the light entrance face 11a of the light guide plate 11, to be specific, an oval opening that is capable of housing the three screw heads 16a in a lump, as shown in FIGS. 5A and 5B, which is disposed at a given position on the back face of the end portion 11d of the light guide plate 11. In particular, having the configuration shown in FIGS. 5A and 5B of having the strip-shaped opening when seen in a plan view that is capable of housing the plurality of screw heads 16a in a lump, the concave portion 12B can be produced by making one-time cutting in the back face of the end portion 11d of the light guide plate 11. Thus, the cost of processing and production of the concave portion 12B can be reduced.

Figure 6A:
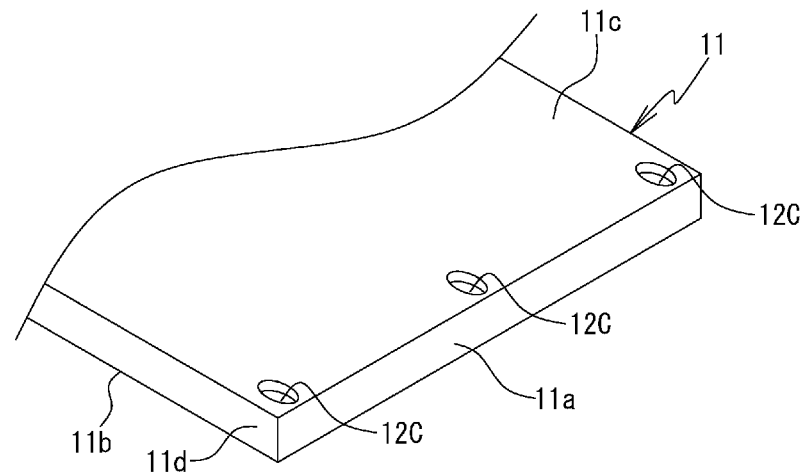
FIGS. 6A and 6B are views of modification 1 and modification 2 of the concave portions of the light guide plate of the first embodiment.
Figure 6B:
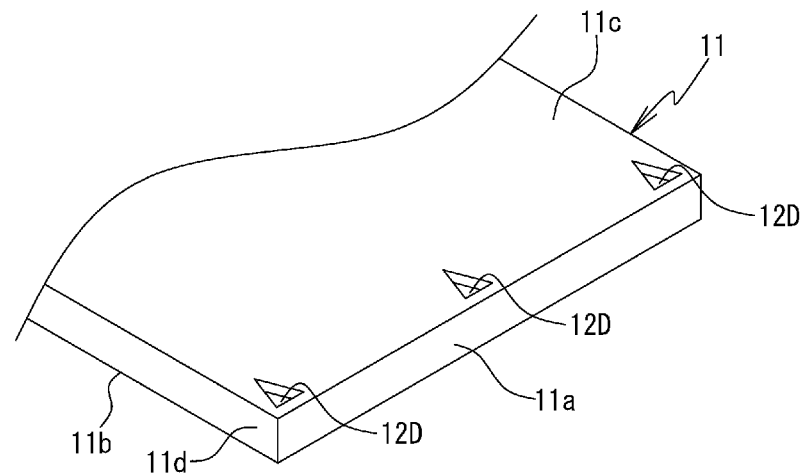
Figure 7A:
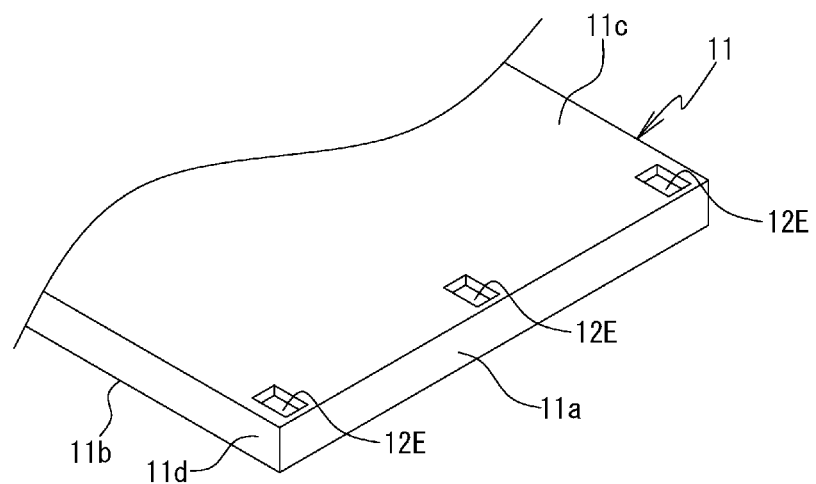
FIGS. 7A and 7B are views of modification 3 and modification 4 of the concave portions of the light guide plate of the first embodiment.
Figure 7B:
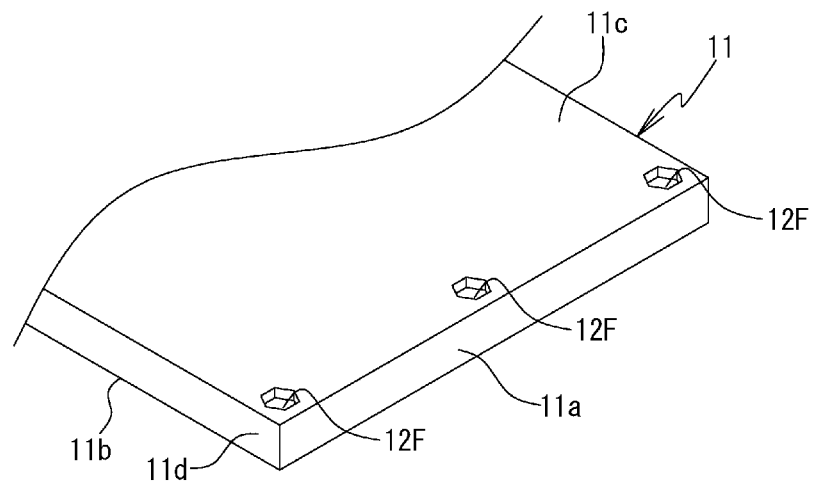

Modifications of the concave portions 12A of the first embodiment described above include concave portions 12C of modification 1 that have oval openings shown in FIG. 6A, and concave portions 12D of modification 2 that have triangular openings shown in FIG. 6B. In addition, modifications of the concave portions 12A of the first embodiment described above include concave portions 12E of modification 3 that have quadrangular openings shown in FIG. 7A, and concave portions 12F of modification 4 that have hexagonal openings shown in FIG. 7B.

Figure 8:
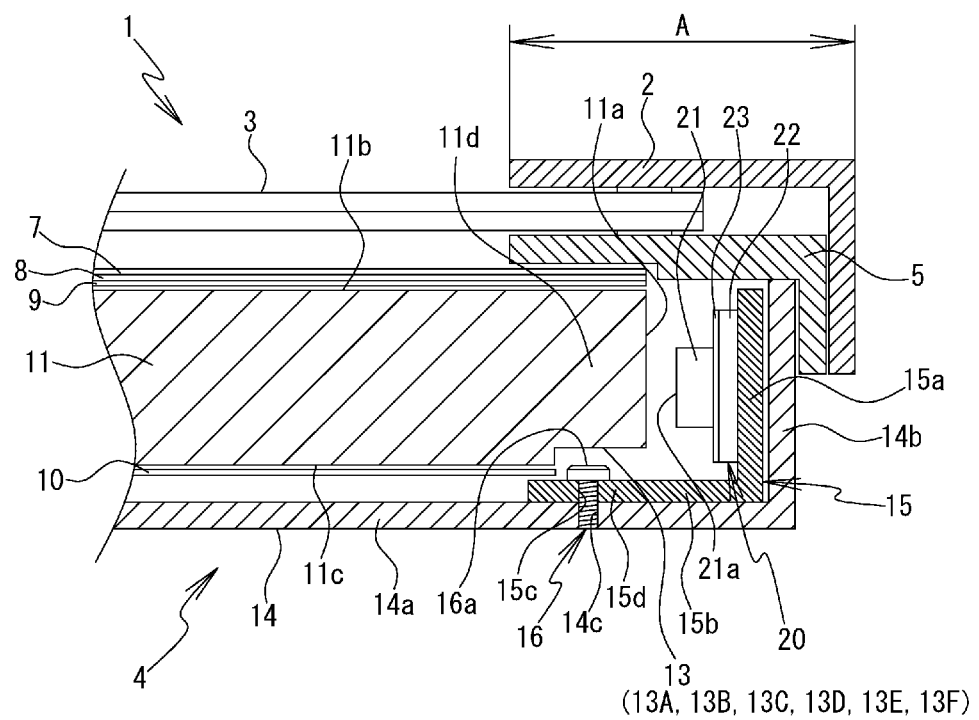
FIG. 8 is a cross-sectional view showing a liquid crystal display device including the light guide plate having a different configuration from the light guide plate shown in FIG. 3.

Next, descriptions of the other preferred embodiment of the present invention will be provided with reference to FIGS. 8 to 10B. FIG. 8 is an enlarged cross-sectional view showing relevant components of a liquid crystal display device of the present embodiment. Explanations of the same components as those in the above-described embodiment are omitted, and different respects are explained mainly, providing the same reference numerals to the same components as those in the above-described embodiment.

As shown in FIG. 8, the light guide plate 11 includes concave portions 13, which are dented to the front side of the light guide plate 11, on the back face of the end portion 11d of the light guide plate 11 at positions where the screw heads 16a of the fixation screws 16 are to be disposed, and the concave portions 13 each have openings having a notch shape extending from the light entrance face 11a. The openings of the concave portions 113 are larger than the external diameter of the screw heads 16a of the fixation screws 16. The concave portions 13 have a depth larger than the height of the screw heads 16a of the fixation screws 16. Thus, getting into the concave portions 13, the screw heads 16a of the fixation screws 16 can be prevented from making contact (interference) with the inner surfaces of the concave potions 13.

As described above, the configuration of including the concave portions 13 disposed at the given positions on the back face of the end portion 11d of the light guide plate 11 can prevent contact (interference) between the light guide plate 11 and the screw heads 16a of the fixation screws 16 disposed on the back face side of the end portion 11d of the light guide plate 11, which can accordingly prevent shavings 118 from being produced from the light guide plate 11 when the light guide plate 11 is shaken as shown in FIG. 18B.

Figure 9A:
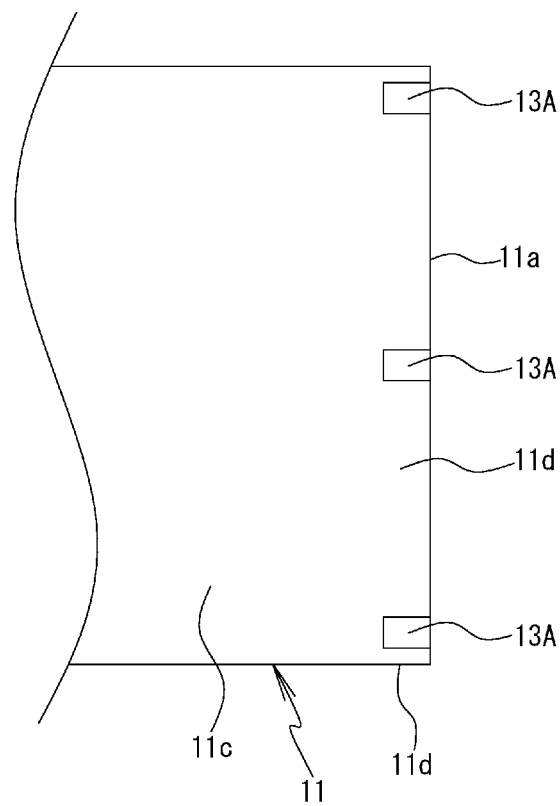
FIG. 9A is a plan view showing a light guide plate of a third embodiment of the present invention, which is seen from behind.
Figure 9B:
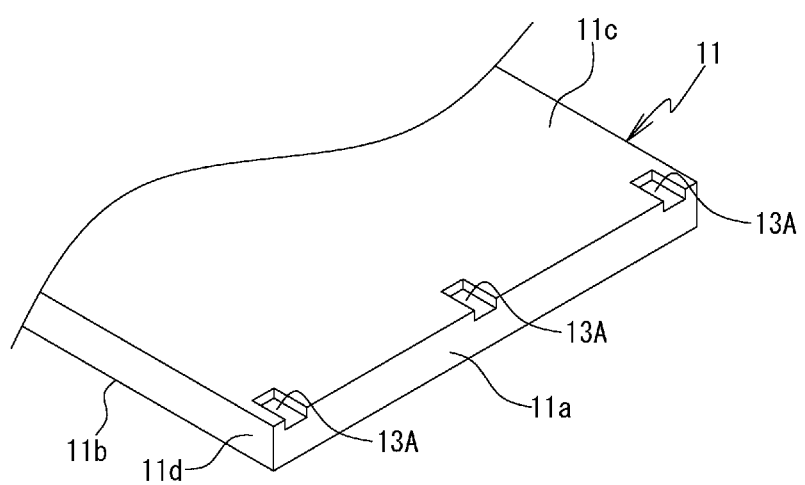
FIG. 9B is an external perspective view showing the same.
Figure 10A:
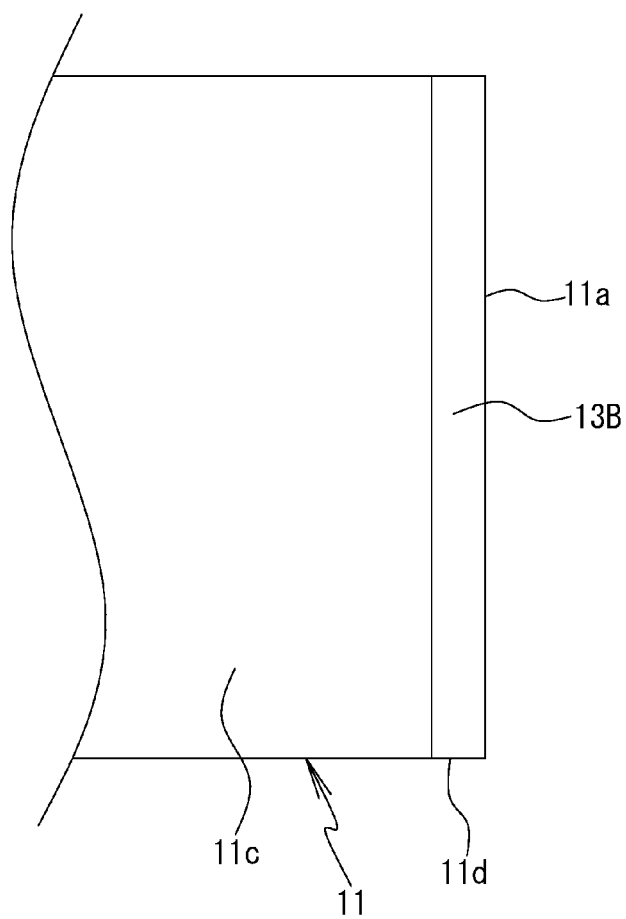
FIG. 10A is a plan view showing a light guide plate of a fourth embodiment of the present invention, which is seen from behind.
Figure 10B:
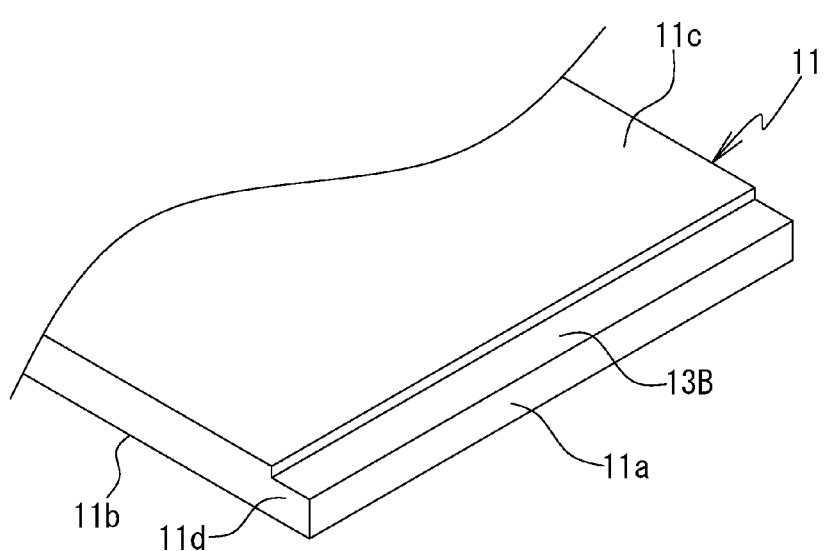
FIG. 10B is an external perspective view showing the same.

The concave portions 13 of a third embodiment define concave portions 13A having quadrangular openings as shown in FIGS. 9A and 9B, which are disposed at the given positions on the back face of the end portion 11d of the light guide plate 11 so as to have a notch shape extending from the light entrance face 11a. Alternatively, the concave portions 13 of a fourth embodiment define a concave portion 13B having a strip-shaped opening disposed in the longitudinal direction of the light entrance face 11a of the light guide plate 11, to be specific, an rectangular opening that is capable of housing the three screw heads 16a in a lump, as shown in FIGS. 10A and 10B, and the concave portion 13B is disposed at a given position on the back face of the end portion 11d of the light guide plate 11 so as to have a notch shape extending from the light entrance face 11a. In particular, having the configuration shown in FIGS. 10A and 10B of having the strip-shaped opening when seen in a plan view that is capable of housing the plurality of screw heads 16a in a lump, the concave portion 13B can be produced by making one-time cutting in the back face of the end portion 11d of the light guide plate 11. Thus, the cost of processing and production of the concave portion 13B can be reduced.

Figure 11A:
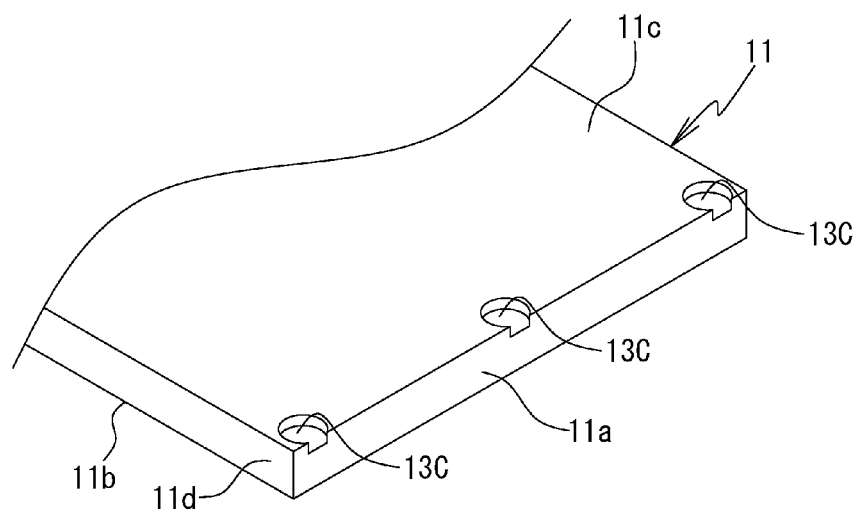
FIGS. 11A and 11B are views of modification 1 and modification 2 of concave portions of the light guide plate of the third embodiment.
Figure 11B:
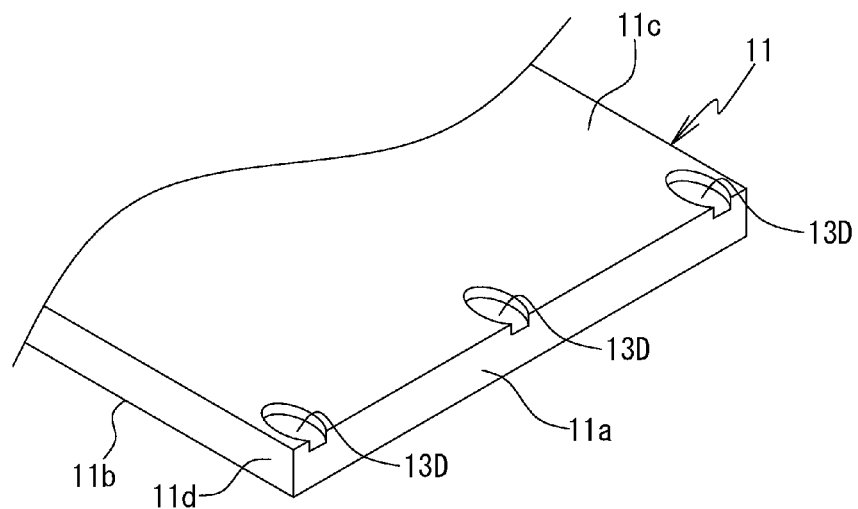
Figure 12A:
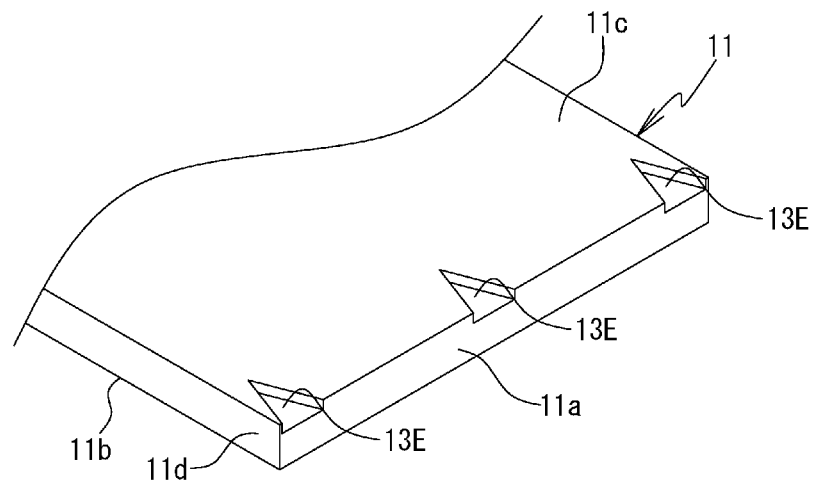
FIGS. 12A and 12B are views of modification 3 and modification 4 of the concave portions of the light guide plate of the third embodiment.
Figure 12B:
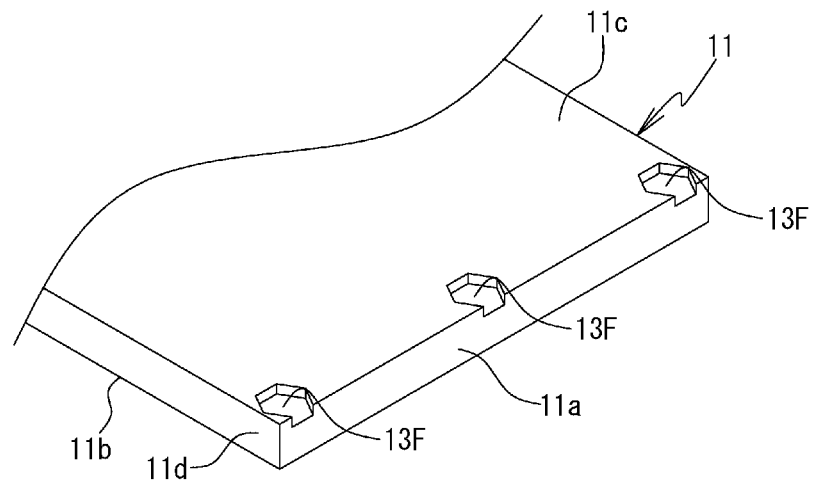

Modifications of the concave portions 13A of the third embodiment described above include concave portions 13C of modification 1 that have round openings shown in FIG. 11A, and concave portions 13D of modification 2 that have oval openings shown in FIG. 11B. In addition, modifications of the concave portions 13A of the third embodiment described above include concave portions 13E of modification 3 that have triangular openings shown in FIG. 12A, and concave portions 13F of modification 4 that have hexagonal openings shown in FIG. 12B.

Figure 13A:
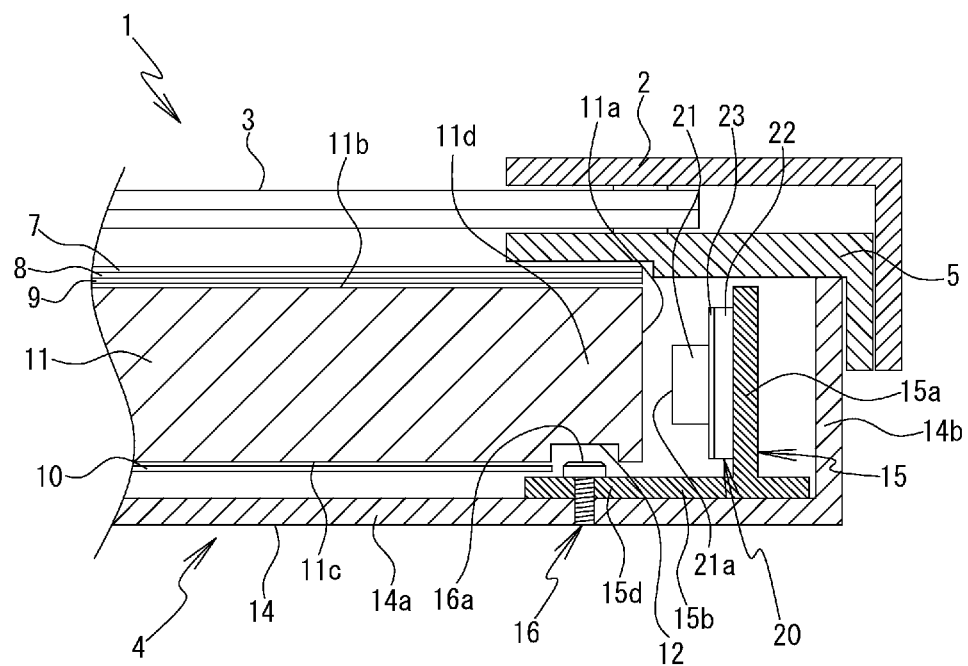
FIGS. 13A and 13B are views of modification 1 and modification 2 of a light source holding member of a preferred embodiment of the present invention.
Figure 13B:
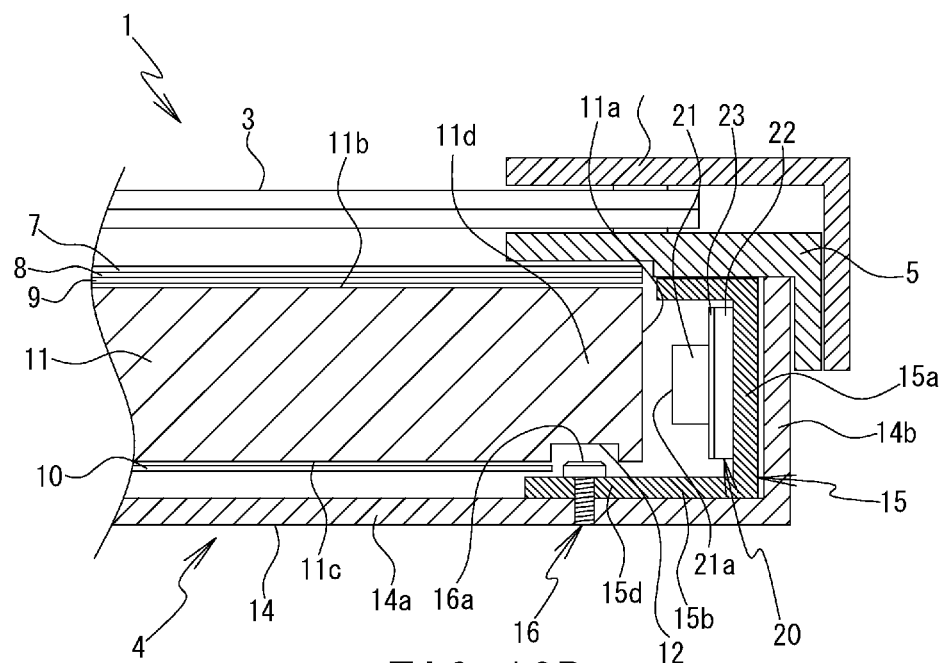
Figure 14:
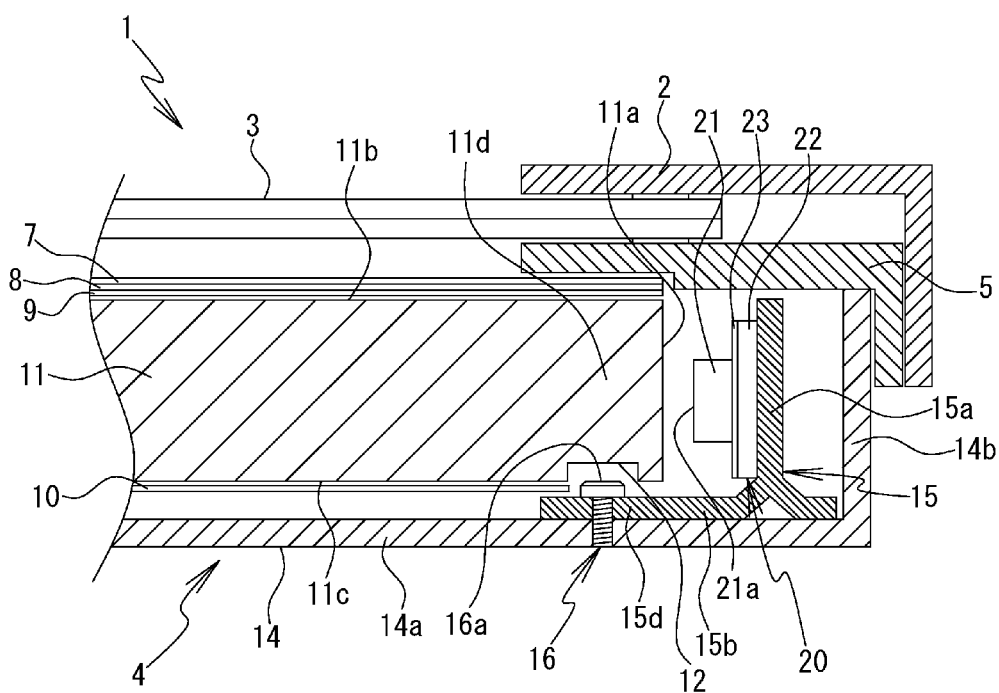
FIG. 14 is a cross-sectional view showing the light source holding member of modification 3 of the preferred embodiment.

Used in the above embodiments is the light source holding member 15 having has the L-shape; however, it is also preferable to use the light source holding member 15 consisting of the plate 15a and the plate 15b, which are disposed so as to have an inverted T-shape as shown in FIG. 13A, as modification 1. Alternatively, it is also preferable to use the light source holding member 15 consisting of the plate 15a and the plate 15b, which are disposed so as to have a laterally laid U-shape as shown in FIG. 13B, as modification 2. Alternatively, it is also preferable to use the light source holding member 15 consisting of the plate 15a and the plate 15b, which are disposed so as to have an inverted Y-shape as shown in FIG. 14, as modification 3.

Figure 15A:
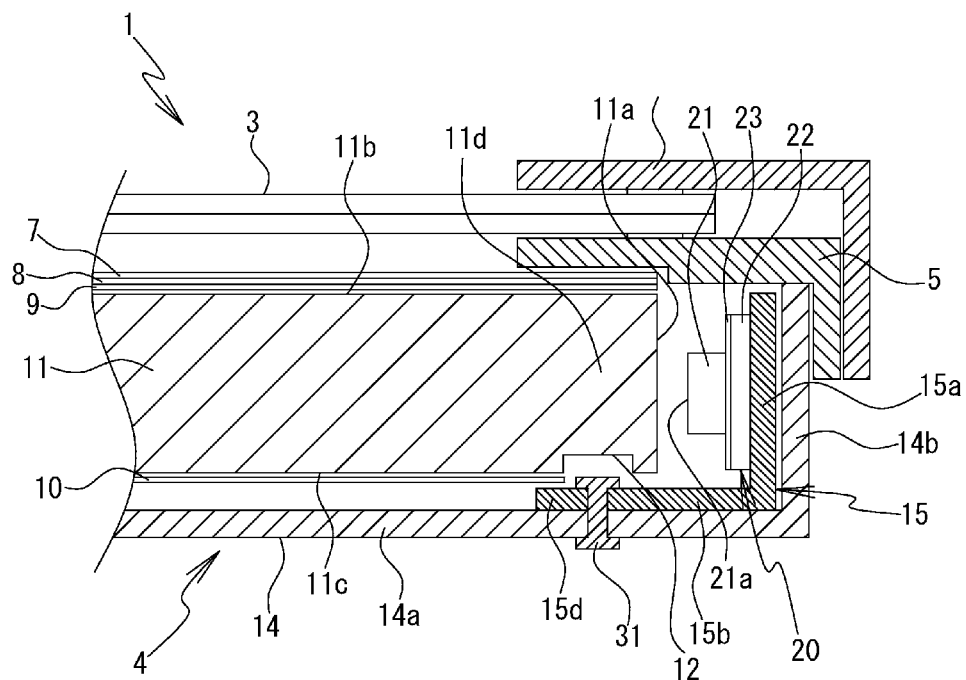
FIGS. 15A and 15B are views of modification 1 and modification 2 of a fixation member of a preferred embodiment of the present invention.
Figure 15B:
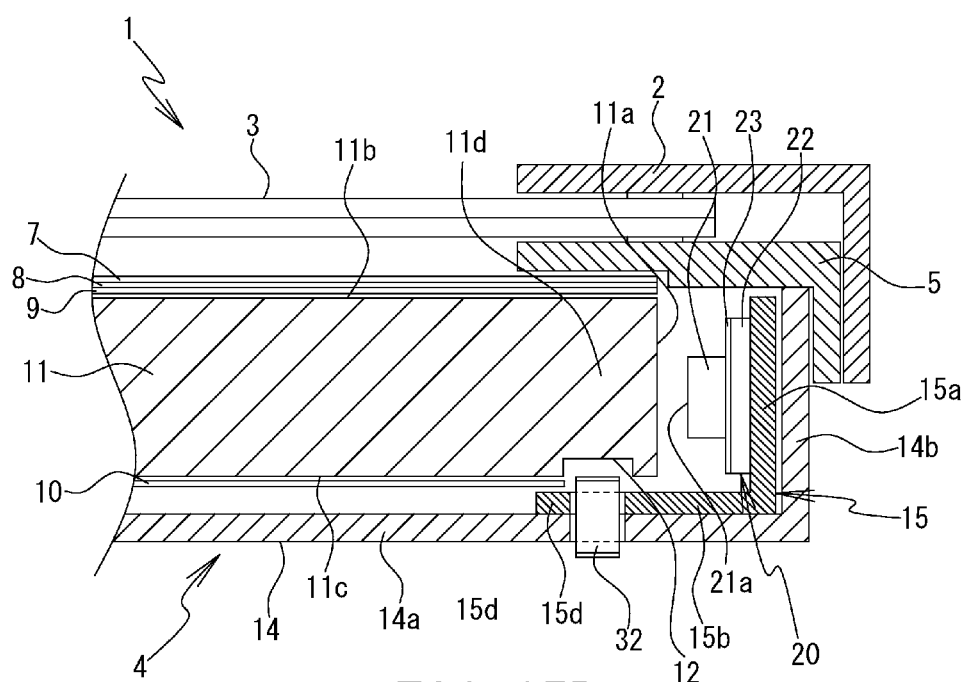
Figure 16:
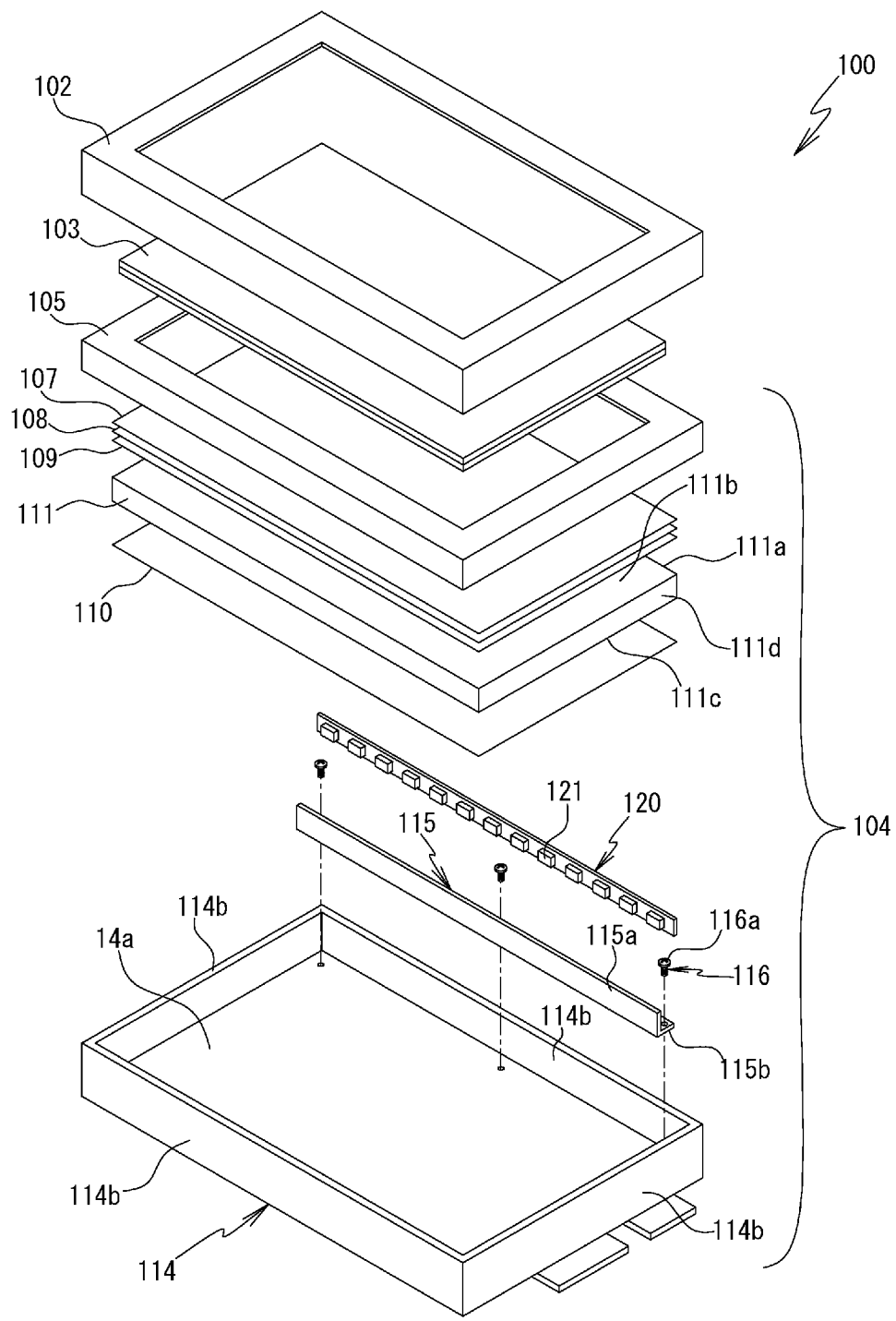
FIG. 16 is an exploded perspective view showing a schematic configuration of a conventional liquid crystal display device.
Figure 17:
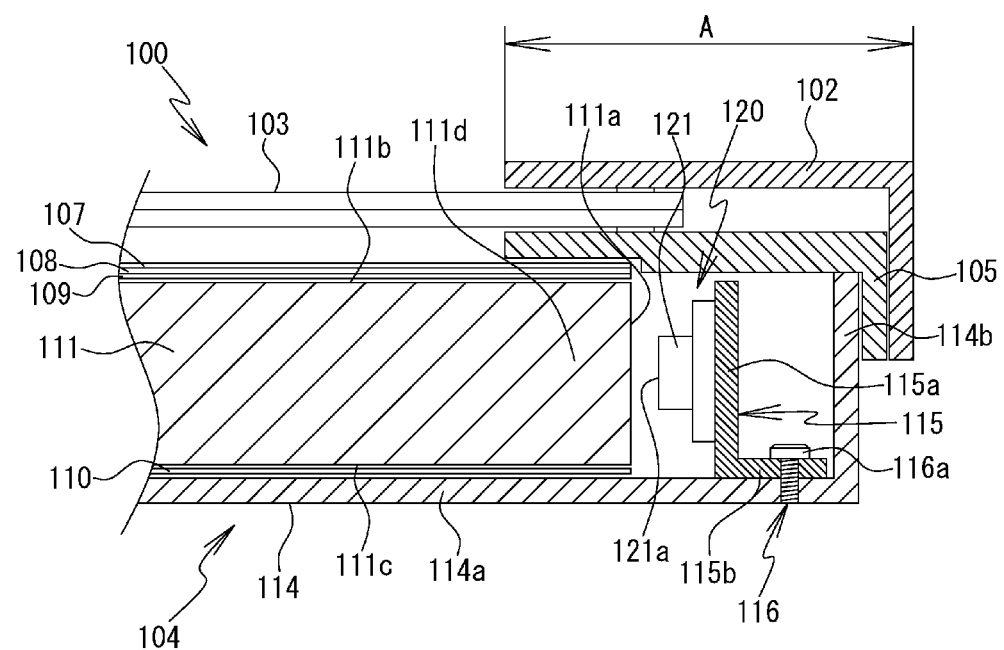
FIG. 17 is an enlarged cross-sectional view of assembled relevant components of the conventional liquid crystal display device shown in FIG. 16.

Used in the above embodiments as the fixation members arranged to fix the light source holding member 15 to the bottom plate 14a of the chassis 14 are the fixation screws 16 such as flat head screws or the hexagonal screws; however, it is also preferable to use rivets 31 shown in FIG. 15A as modification 1. Alternatively, it is also preferable to use clips 32 arranged to sandwich the plate 15b of the light source holding member 15 and the bottom plate 14a of the chassis 14 shown in FIG. 15B as modification 2.

The foregoing description of the preferred embodiments of the present invention has been presented for purposes of illustration and description with reference to the drawings. However, it is not intended to limit the present invention to the embodiments, and modifications and variations are possible as long as they do not deviate from the principles of the present invention. For example, described in the above-described embodiments is the configuration that an LED board is disposed opposed to one long side of a rectangular-shaped light guide plate; however, the number of LED boards to be included is changeable appropriately. For example, it is preferable that LED boards are disposed opposed to a pair of opposed long sides of the light guide plate. Alternatively, it is preferable that LED boards are disposed opposed to one long side and one short side of the light guide plate. Alternatively, it is preferable that LED boards are disposed opposed to the four sides of the light guide plate. In this case, the concave portions 12A to 12F, 13A to 13F can be chosen appropriately to be disposed on the back faces of the end portions on the sides of the light guide plate, where the LED boards are disposed opposed to the sides.

The invention claimed is:

1. An illuminating device comprising:
a light guide plate that is disposed on an inner bottom face of a chassis, the light guide plate comprising:
a light entrance face disposed on a lateral end face of the light guide plate, from which light projected from a light source enters; and
a light exit face having a planar shape disposed on an upper face of the light guide plate, from which the entering light exits; and
a light source holding member that is disposed on an inside face of the chassis while opposed to the light entrance face of the light guide plate, and comprises the light source arranged to project the light onto the light entrance face of the light guide plate,
wherein the light source holding member is fixed to the inner bottom face of the chassis by a fixation member, and
wherein the illuminating device further comprises a concave portion on a back face of the light guide plate, the concave portion being arranged to prevent contact with a jutting end of the fixation member.

2. The illuminating device according to claim 1,
wherein the light source holding member further comprises:
a plate to which the light source is attached; and
a plate arranged to be fixed to a bottom plate of the chassis by the fixation member, the plates being disposed having an L-shape,
wherein an end portion of the plate arranged to be fixed to the bottom plate of the chassis, the end portion being disposed on a side of the light guide plate, overlaps with a back face of an end portion of the light guide plate when seen in a plan view.

3. The illuminating device according to claim 1,
wherein the light source holding member further comprises:
a plate to which the light source is attached; and
a plate arranged to be fixed to a bottom plate of the chassis by the fixation member, the plates being disposed having an inverted T-shape,
wherein an end portion of the plate arranged to be fixed to the bottom plate of the chassis, the end portion being disposed on a side of the light guide plate, overlaps with a back face of an end portion of the light guide plate when seen in a plan view.

4. The illuminating device according to claim 1,
wherein the light source holding member further comprises:
a plate to which the light source is attached; and
a plate arranged to be fixed to a bottom plate of the chassis by the fixation member, the plates being disposed having a laterally laid U-shape,
wherein an end portion of the plate arranged to be fixed to the bottom plate of the chassis, the end portion being disposed on a side of the light guide plate, overlaps with a back face of an end portion of the light guide plate when seen in a plan view.

5. The illuminating device according to claim 1,
wherein the light source holding member further comprises:
a plate to which the light source is attached; and
a plate arranged to be fixed to a bottom plate of the chassis by the fixation member, the plates being disposed having an inverted Y-shape,
wherein an end portion of the plate arranged to be fixed to the bottom plate of the chassis, the end portion being disposed on a side of the light guide plate, overlaps with a back face of an end portion of the light guide plate when seen in a plan view.

6. The illuminating device according to claim 1, wherein the concave portion has a notch shape extending from the light entrance face of the light guide plate.

7. The illuminating device according to claim 1,
wherein the fixation member comprises a plurality of fixation members that are disposed in a longitudinal direction of the light entrance face of the light guide plate, and
wherein the concave portion has a strip shape when seen in a plan view to house the plurality of fixation members in a lump.

8. The illuminating device according to claim 1, wherein the concave portion has a round shape when seen in a plan view.

9. The illuminating device according to claim 1, wherein the concave portion has an oval shape when seen in a plan view.

10. The illuminating device according to claim 1, wherein the concave portion has a triangular shape when seen in a plan view.

11. The illuminating device according to claim 1, wherein the concave portion has a quadrangular shape when seen in a plan view.

12. The illuminating device according to claim 1, wherein the concave portion has a hexagonal shape when seen in a plan view.

13. The illuminating device according to claim 1, wherein the fixation member comprises a flat head screw.

14. The illuminating device according to claim 1, wherein the fixation member comprises a hexagonal screw.

15. The illuminating device according to claim 1, wherein the fixation member comprises a rivet.

16. The illuminating device according to claim 1, wherein the fixation member comprises a clip arranged to sandwich the light source holding member and the bottom plate of the chassis.

17. A display device comprising:
the illuminating device according to claim 1; and
a display panel arranged to make a display by using the light emitted from the illuminating device.

18. The display device according to claim 17,
wherein the display panel comprises a liquid crystal display panel comprising a pair of substrates, and liquid crystals filled between the substrates.

19. A television receiving device that comprises the display device according to claim 17.

* * * * *